Sept. 22, 1931.  F. W. ROBERTSHAW ET AL  1,824,057
DIAPHRAGM VALVE AND METHOD OF OPERATING THE SAME
Filed Sept. 17, 1926  5 Sheets-Sheet 1

INVENTOR
Frederick W. Robertshaw
George A. Robertshaw
by their attys.
Byrnes, Stebbins & Parmelee

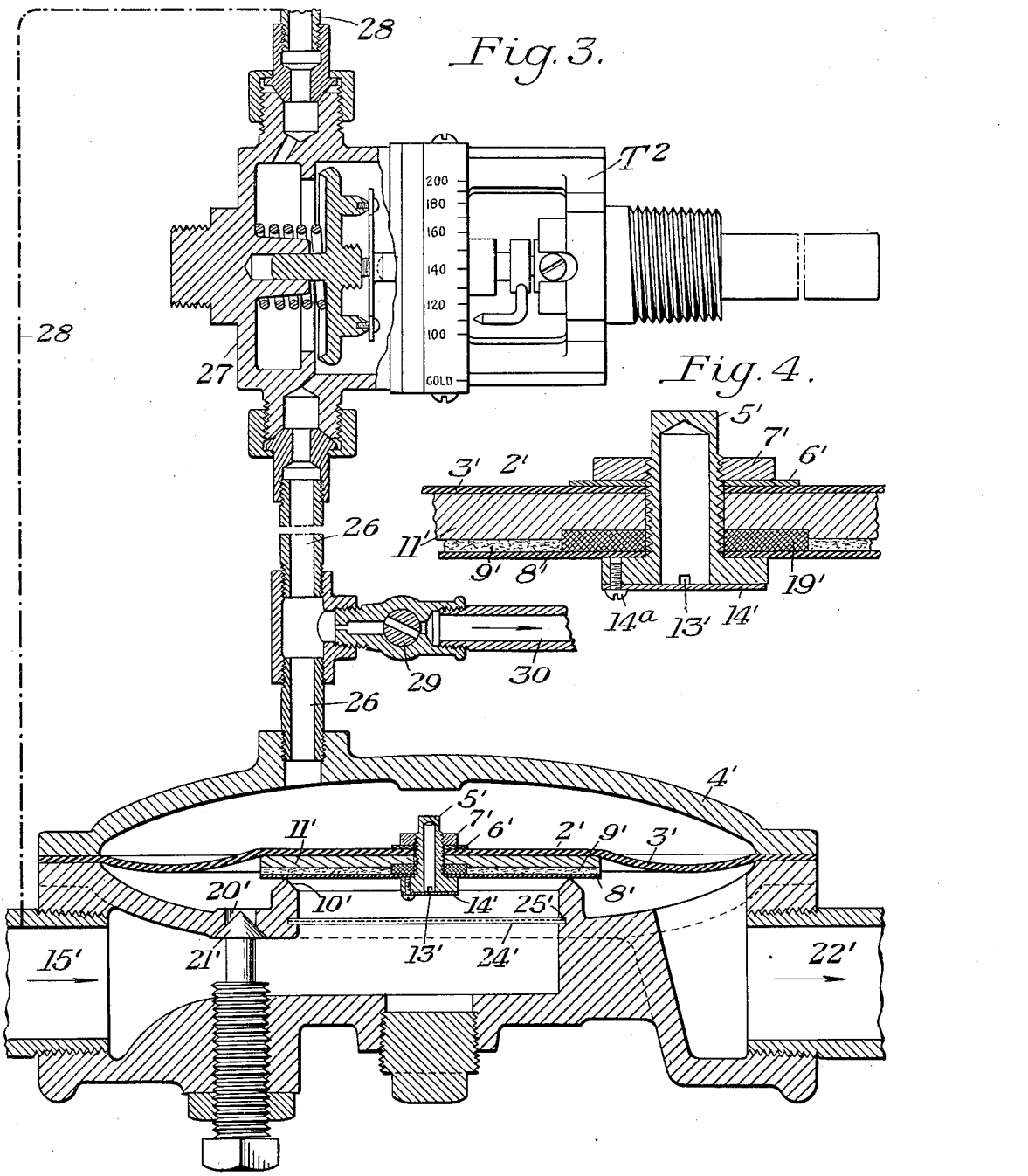

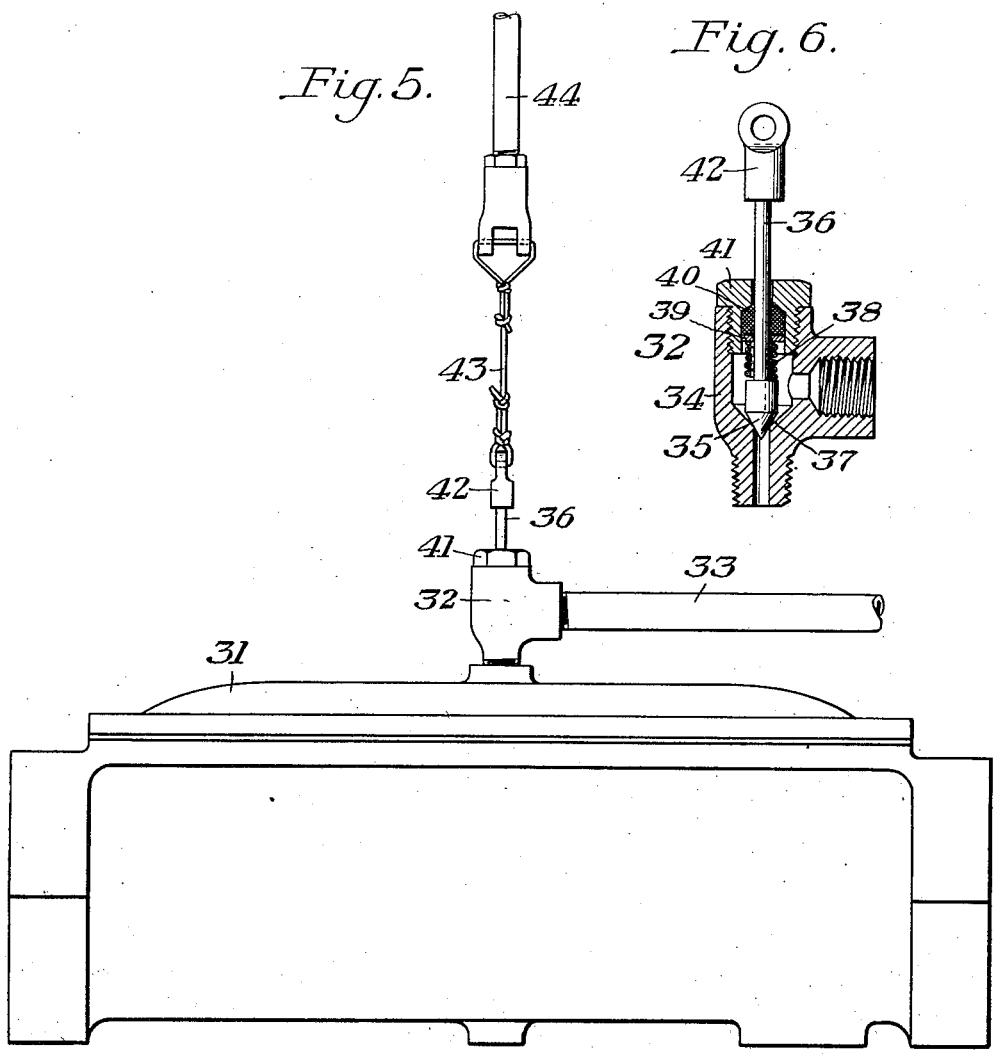

Sept. 22, 1931.  F. W. ROBERTSHAW ET AL  1,824,057
DIAPHRAGM VALVE AND METHOD OF OPERATING THE SAME
Filed Sept. 17, 1926   5 Sheets-Sheet 4

INVENTOR
Fredrick W. Robertshaw
George A. Robertshaw
by their attys.
Byrnes, Stebbins + Parmelee Sept. 22, 1931. F. W. ROBERTSHAW ET AL 1,824,057
DIAPHRAGM VALVE AND METHOD OF OPERATING THE SAME
Filed Sept. 17, 1926 5 Sheets-Sheet 5

INVENTOR
Frederick W. Robertshaw
George A. Robertshaw
by their attys.
Byrnes, Stebbins & Parmelee Patented Sept. 22, 1931

1,824,057

UNITED STATES PATENT OFFICE

FREDERICK W. ROBERTSHAW, OF PITTSBURGH, AND GEORGE A. ROBERTSHAW, OF GREENSBURG, PENNSYLVANIA

DIAPHRAGM VALVE AND METHOD OF OPERATING THE SAME

Application filed September 17, 1926. Serial No. 136,028.

The present invention relates broadly to the control of gas flow, and more particularly to diaphragm valves used in connection therewith.

This invention is particularly adapted for use with diaphragm valves wherein the position of the valve element is controlled by differential gas pressure operating on the diaphragm to which the valve element is attached. Valves of this type are shown and described in the patent to Frederick W. Robertshaw, No. 1,097,265 of May 19, 1914, and the patent to George A. Robertshaw, No. 1,107,549 of August 18, 1914.

Valves such as disclosed in said Patent 1,097,265 are closed by the weight of the valve element when gas pressure has been equalized on both sides of the diaphragm by means of a small bleed hole through the diaphragm, said bleed hole permitting back pressure to build up on the side of the diaphragm opposite the gas supply inlet. The valve is moved, when desired, by suitably unbalancing the pressure on the diaphragm by reducing the back pressure.

It has been found that certain gases tend to deposit solid matter from the gases, as well as dirt, in the bleed hole and so impair the operation of the valve. Any such difficulty is obviated by our invention by the provision of a baffle system whereby the gas is directed in such manner and at such velocity that the deposition of solid matter therefrom is minimized.

Furthermore, in valves of this general type, trouble is apt to develop from leakage of gas through the diaphragm around the part used to attach the valve element to the diaphragm. This trouble has been largely due to the sealing means employed around this part. The present invention, however, contemplates an improved construction wherein the parts are light and easily assembled and yet gas-tight connection is afforded at all times, so that any gas passing through the diaphragm is limited to the predetermined orifice of the bleed hole.

On account of the limited closing pressure usually available in valves of this general type, difficulty has been experienced in securing a tight seating of the valve disk. In overcoming this trouble, our invention affords an improved valve having a relatively soft seating valve washer, a somewhat resilient backing washer which permits the seating valve washer to adjust itself to accommodate inaccuracies in the valve seat, and a stiff disk which maintains the said washer in such position as to present a substantially plane valve element. It will thus be seen that while the valve disk is normally flat, a cushion seating is afforded.

A further object of our invention is the provision of a control valve and method of operating the same, whereby the main diaphragm valve may be operated in accordance with various characteristics of the system in which it is utilized.

The foregoing and other objects, together with their attendant advantages, will be better understood by reference to the accompanying drawings illustrating certain preferred embodiments of our invention.

In the drawings—

Figure 3 is a view, similar to Figure 1, showing a different type of valve;

Figure 4 is a sectional detail view similar to Figure 2 illustrating a modified construction;

Figure 5 is a side elevation of a diaphragm valve having a control valve fitted thereto;

Figure 6 is a detail sectional view of the control valve used in connection with the diaphragm valve shown in Figure 5, this figure being on an enlarged scale;

Figure 1:
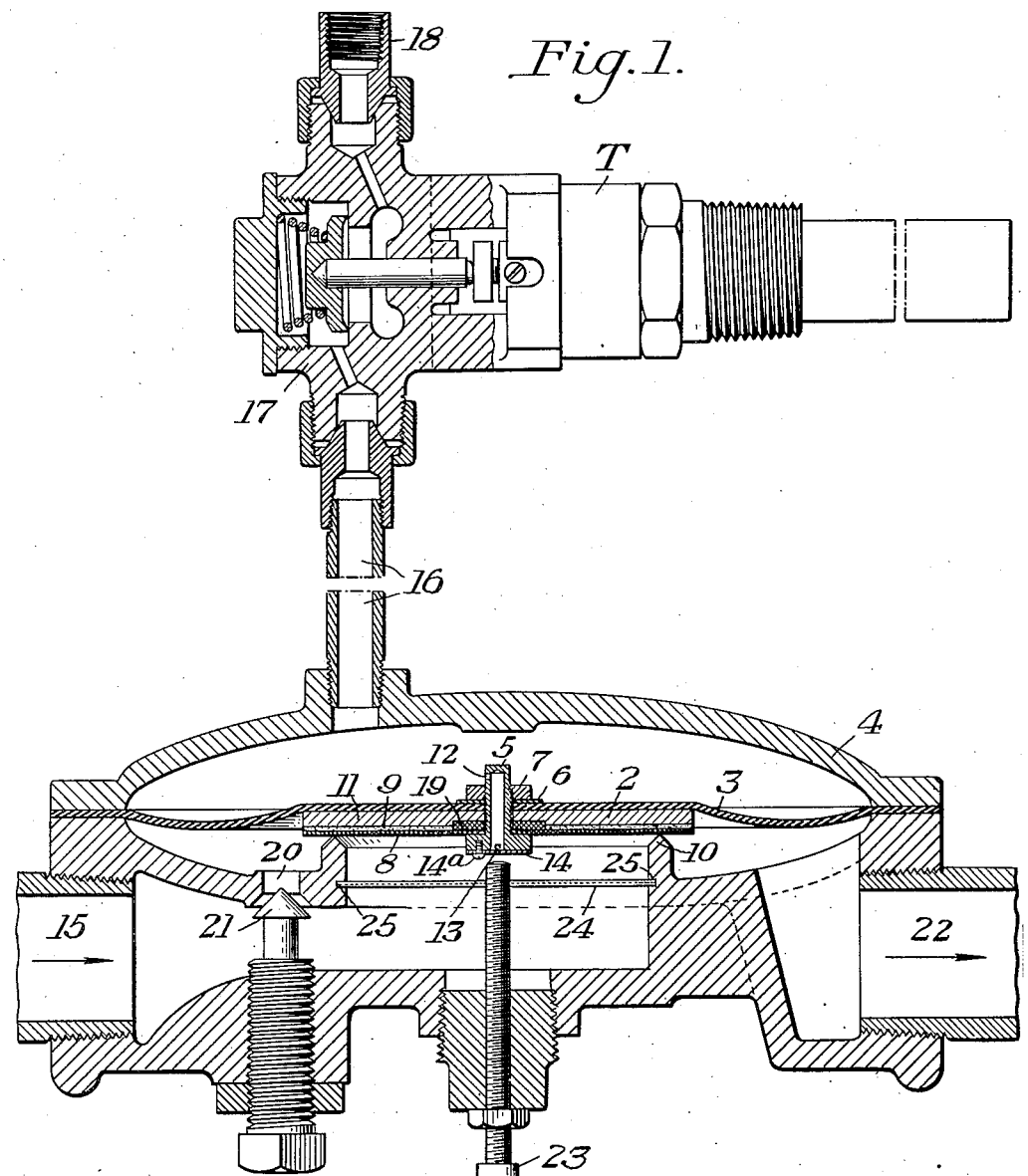
Figure 1 is a sectional elevation of a diaphragm valve and a thermostatic control therefor.

Referring, first, to the embodiment illustrated in Figure 1, there is shown a diaphragm valve having a disk valve 2 attached to a flxeible diaphragm 3 which is secured between the upper and lower portions of a casing 4. The disk valve 2 is preferably secured to the diaphragm 3 by means of a hollow screw 5 which clamps the diaphragm between a suitable washer 6 and the disk valve 2 by a nut 7.

Figure 2:
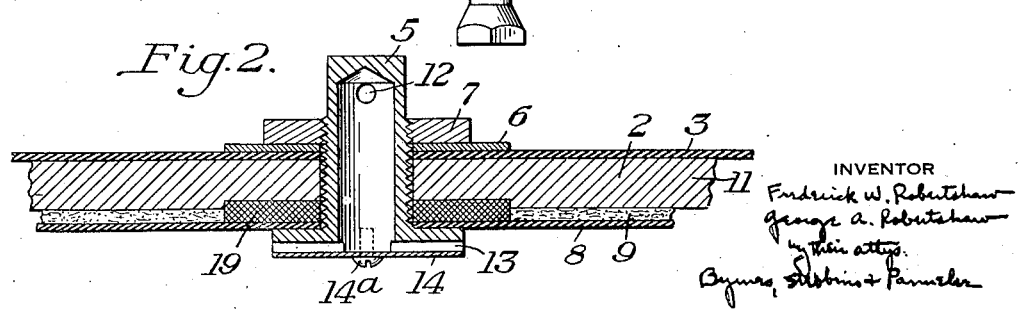
Figure 2 is a sectional detail view of the disk valve and bleed hole baffle.

The disk valve 2 (Figure 2) preferably comprises a relatively soft seat washer 8, a resilient backing washer 9, whereby the seat washer 8 is pressed into engagement with a valve seat 10, and a stiffening disk 11 which maintains the washers aforesaid in such position as to present a substantially plane seating surface to the valve seat 10.

The hollow screw 5 is provided with a bleed hole 12 which establishes communication from one side of the diaphragm 3 to the other. Gas enters the hollow screw through a slot 13 in the head thereof. We preferably provide that a plate 14, eccentrically fastened to the screw 5, overlies the slot 13 and thereby forms two restricted gas passages communicating with the hollow interior of the screw 5. We have found that the tendency of certain gases to deposit solid matter in the bleed hole is materially reduced by baffling the gas so that it enters the hollow interior of the screw 5 at a substantial angle, preferably normal to the axis thereof. We have found that by deflecting the gas, and maintaining a relatively low gas velocity, solid matter is not deposited in the bleed hole in amounts sufficient to cause trouble. Furthermore, the baffle plate 14 prevents any metal chips or other foreign matter from passing directly into the hollow screw and then to the bleed hole. Inasmuch as the baffle plate 14 is eccentrically carried (Figure 4) by a screw 14ª, it may be simply swung to one side if it becomes necessary to remove dirt from the passages in the hollow screw 5.

This valve, which is described in U. S. Letters Patent No. 1,097,265, operates as follows:

Gas supplied under pressure through an inlet 15 in the casing 4, tends to lift the disk valve 2 off the seat 10; the bleed hole 12, however, permits gas to pass through the diaphragm and, if there is no escape from the upper chamber in the casing 4, a back pressure is built up which equals the pressure of the gas below the disk valve 2. When this condition obtains, the disk valve 2 remains at rest on the valve seat 10 because the areas are equal and the weight of the valve determines the position which it will assume and retain. In order to move the disk valve 2 from the valve seat 10, it is necessary to relieve the back pressure in the upper portion of the casing 4. This is accomplished through an outlet pipe 16 which leads to a control valve 17 operated by a thermostat T in the illustrated case. From the drawings, it will be obvious that when the valve 17 is opened, the pressure on the upper side of the diaphragm 3 is relieved, thereby permittting the incoming gas below the diaphragm to lift the disk valve 2. The gas taken from the upper portion of the casing 4 is led from the valve 17 through a pipe 18 to any desired point. If the gas be air, the pipe 18 simply discharges into the atmosphere, whereas, if the gas be combustible it may be led to a burner.

In order that the valve be sensitive, the diaphragm 3 should be flexible and the disk valve 2 should be light. But the valve disk should be true, or leakage will result. We have found that a leather seat washer 8, supported by a felt packing washer 9 gives good results in practice. In order that the stiffening disk 11 may be light and yet be thick enough to have its surfaces machined true, we preferably provide that the disk 11 be made of aluminium or similar light metal. We have found that the above materials give good results, but it will be apparent that other materials having the desired characteristics may be employed.

In order to prevent leakage through the diaphragm other than through the predetermined orifice of the bleed hole 12, and also to enable the parts to be held against loosening, we preferably provide a hard washer 19 which nests within the inner diameter of the packing washer 9 and abuts the stiffening disk 11. The washer 19 gives a practically unyielding packing for the head of the screw 5, thereby enabling the parts to be drawn tightly enough together to prevent any tendency to work loose, and also effecting a gas-tight joint.

A by-pass 20 controlled by a screw-adjusted valve 21 connects the inlet passage 15 with the lower portion of the interior of the casing 4 lying outside the valve seat 10, thereby forming an open passage through the casing to an outlet 22, and thus permitting gas flow when the disk valve 2 is seated. It will be observed, however, that the minimum flow permitted thereby is limited by the size of the bypass 20. In our improved valve, however, a minimum flow adjustment is provided on the disk valve 2. This adjustment comprises a screw 23 abutting the plate 14. In the drawings, the screw 23 is not touching the plate 14, but it will be apparent that if the screw were turned up a few more threads the disk valve 2 would be lifted from the seat 10 and a predetermined minimum flow could be established through the main valve.

On large appliances it is often desirable not to reduce the flow of gas very much, and in such cases the regular bypass 20 is not sufficient and could hardly be made of sufficient size without restricting the gas port too much. In such a case we provide for an ample minimum flow by placing the screw 23 in such a position that the disk valve is maintained a definite distance off its seat.

In order to prevent large foreign particles from entering the diaphragm chamber and lodging on the valve seat or the leather washer, we provide a screen 24 located in the inlet gas passage just below the valve seat 10. When placed in this position, the screen filters the gas immediately before it reaches the valve seat. This has been found to be more effective and serviceable than any screen placed in the pipe line ahead of the diaphragm valve, as it has been found that when pipe is screwed into the valve casing, metal chips will dislodge from the threads, and compound used on the pipe threads is apt to be carried into the valve by the gas. While we preferably provide that the screen 24 be made of metal, and we simplify the assembly by simply snapping the screen into a cooperating annular groove 25, it will be apparent that any suitable construction may be employed which places the screen 24 between the valve seat 10 and any threaded connection on the inlet side of the valve seat 10.

Referring now to Figure 3, there is shown a valve, similar to the valve shown in the patent to George A. Robertshaw, No. 1,107,549, which is operated by differential pressure on the diaphragm, similarly to the valve as shown in Figure 1, but provided with a modified system for controlling the differential pressure. Like the valve shown in Figure 1, this valve has a disk valve 2' fastened to a flexible diaphragm 3' which is secured between the upper and lower portions of a casing 4'. A hollow screw 5' secures the disk valve 2' to the diaphragm 3' by means of a suitable washer 6' and a nut 7'. The disk valve 2' is comprised of a flexible seat washer 8', a resilient packing washer 9' and a stiffening disk 11'.

The hollow screw 5' is illustrated as being the same as that employed in the previously described valve, but without the provision of a bleed hole. It is a matter of convenience in manufacture to have the corresponding parts of the various valves interchangeable as far as possible, but it will be understood that the invention is not limited to such embodiment.

The bypass 25, effective for connecting the inlet 15' and the outlet 22', is illustrated as being closed by a screw-actuated valve 21'. The valve 21' is, of course, adjustable to suit the conditions under which the valve is operating.

No manual opening screw 23 (Figure 1) for adjusting the minimum flow through the main valve has been illustrated in the valve shown in Figure 3, but it will be apparent to one skilled in the art that such an adjustment may be provided if desired.

The diaphragm 3' and disk valve 2' are controlled by gas entering the lower portion of the casing 4' through the inlet 15' and gas entering the upper portion of the casing 4' through a pipe 26. When the total force exerted by the gas on the parts is the same from above and below, the disk valve 2' seats by gravity and no gas can flow past the seat 10'. After the valve 2' is seated, it will remain seated until the back pressure on the upper side of the diaphragm is relieved.

Gas is passed into the pipe 26 through a valve 27 from a pipe 28 which may be connected, as shown by the chain line, into the main gas supply line. By means of a manually operated valve 29 gas is being constantly bled from the pipe 26, the gas so bled being preferably led through a pipe 30 to a pilot light. It will thus be seen that in order to close the disk valve 2', the control valve 27 must admit sufficient gas to the pipe 26 to build up a pressure therein greater than the manual bleed valve 29 will relieve. When the control valve 27 is closed, the pressure on the upper portion of the diaphragm 3' will be relieved through the manual control bleed valve 29 and the disk valve 2' will uncover the valve seat 10'.

It will be understood that the pipe 30 may lead to any desired point, and if the gas being valved is not combustible, the manual bleed valve 29 may discharge directly into the atmosphere.

Furthermore, while we have illustrated the control valve 27 as being operated by a thermostat T², it will be obvious that this valve may be controlled in accordance with characteristics of the system other than temperature, if desired.

In Figure 5, we have shown a side elevation of a diaphragm valve having a mechanically operated control valve 32 fitted into the upper portion of the casing. A discharge pipe 33 leads from the control valve 32 to any desired point, depending somewhat upon the character of gas valve and upon the system in which the mechanism is employed.

The valve 32 is preferably made (Figure 6) with a casing 34 in the form of a T. A conical valve element 35 carried on a rod 36 is pressed into engagement with a valve seat 37 by means of a helical spring 38. The helical spring 38 abuts a washer 39 which is effective for pressing a suitable packing 40 around the rod 36, thereby preventing leakage. The washer 39 and the rod 36 are suitably guided in a hollow plug 41 closing one end of the T.

Fitted to the upper end of the rod 36 is a suitable eye coupling 42 by which a tension member 43 controls the position of the valve element 35 in accordance with the movement of a rod 44 which is controlled in response to any desired function of the system in which the valve is employed.

If the valve 31 be of the type shown in Figure 1, the pipe 33 will be a relief line, and opening the small control valve 32 will result in opening the main diaphragm valve, whereas if the diaphragm valve 31 be of the type shown in Figure 3, the pipe 33 will be a pressure line, and opening the small control valve 32 will result in closing the main diaphragm valve.

Figure 7:
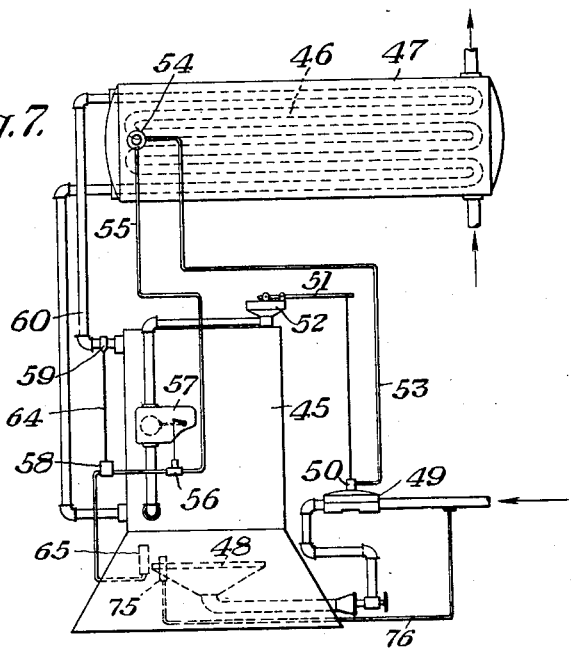
Figures 7, 8, 9 and 10 are diagrammatic views showing various applications of our invention.

Figure 7 illustrates what is known as the indirect system of water heating. This system employs a steam boiler 45 which supplies steam to a coil 46 within a storage tank 47. The storage tank 47 contains the water which is heated and delivered to the hot water system. The boiler 45 is heated by a suitable burner 48 which is supplied by gas through a diaphragm valve 49. The diaphragm valve 49, which, in this case, is a valve operable similarly to the valve employing a bleed hole illustrated in Figure 1, is fitted with a small control valve 50 which is normally open to relieve the back pressure above the diaphragm in the valve 49 which would tend to close the valve 49.

The control valve 50 is operatively connected to a lever 51 which is moved in accordance with variations in the steam pressure within the boiler 45 by means of a steam responsive diaphragm mechanism 52. The lever 51 is connected in such manner that increases in the steam pressure within the boiler 45 will operate the lever 51 so that the control valve 50 is closed, thereby permitting back pressure to build up on top of the diaphragm in the valve 49 and shutting off the gas supplied to the burner 48.

In order that the system may be controlled to avoid high water temperatures within the storage tank 47, we provide that the outlet 53 from the control valve 50 leads to a thermostatically-operated valve 54 which is controlled by a thermostat within the storage tank 47. The valve 54 is so connected that increases in water temperature within the tank 47 will result in closing the valve 54 and so permit back pressure to build up in the valve 49 and shut off the main gas supply. Obviously, the valve 54 may be set to close at any desired temperature, but a temperature of 180 degrees Fahrenheit or thereabouts is ordinarily employed.

As a further safeguard, the valve 54 discharges through an outlet pipe 55 which leads to a mechanically operable valve 56. The valve 56 is connected to a water level responsive device 57 which is so adjusted as to close the valve 56 when the water level in the boiler 45 falls below a predetermined safe minimum value. The device 57 may comprise the usual ball float well understood in the art, and the valve 56 may be similar to the valve 32 shown in Figure 5.

Figure 11:
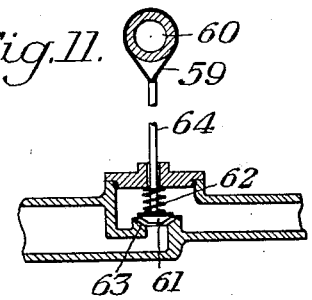
Figure 11 is a diagrammatic detail section of the fusibly operable valve preferably employed.

In order that the temperature of the boiler 45 may never rise beyond a safe point, we preferably provide that the outlet from the valve 56 pass to a valve 58 which is operated by the fusion of a fusible link 59 surrounding a steam pipe 60 leading from the boiler 45 to the steam coil 46. As shown in Figure 11, the valve 58 comprises a valve element 61 normally urged by a spring 62 toward a seat 63. The valve 61 is held off the seat by a tension member 64 which is connected to a fusible link 59 which surrounds the pipe 60. It will thus be seen that fusion or failure of the link 59 through excess temperature of the pipe 60 will result in the spring 62 closing the valve 58, which will result in shutting off the main gas supply in a manner similar to closing valves 50, 54 or 56. The general arrangement of the fusible safety device is illustrated and described in our co-pending application, Serial No. 751,875.

Figure 12:
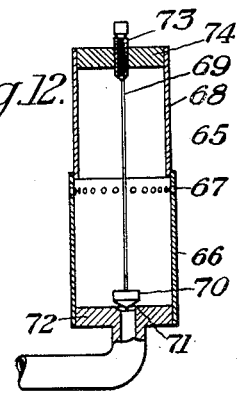
Figure 12 illustrates the preferred form of thermostatically controlled pilot employed.

Gas is led from the valve 58 to a pilot burner 65 which is preferably of the type illustrated in Figure 12. This burner comprises a casing 66 having orifices 67 for egress of gas to support the pilot flame. Fitted into the upper portion of the casing 66 is a tube 68 preferably made of some material having a rather high coefficient of expansion, for example copper. It will be noted that the tube 68 is bathed in the hot gases from the pilot flame supported by gas issuing from the orifices 67. Depending from the top of the tube 68 is a rod 69 connected to a valve element 70 which cooperates with a valve seat 71 formed in a base plug 72 to which the casing 66 is attached. The top of the rod 69 is attached to a screw 73 which is threaded into a plug 74 closing the top of the tube 68. The screw 73 provides for adjustment of the valve 70 with respect to the seat 71.

From the drawings it will be apparent that as long as the tube 68 is expanded, the valve 70 will be raised from the seat 71, but if the pilot flame goes out and the tube 68 contracts, the valve 70 will approach the seat 71. By suitably adjusting the screw 73, the thermostatic pilot may be arranged to close the valve 70 completely when the pilot light has gone out. By referring to Figure 7, it will be seen that the effect of closing the valve 70 will be to build up a back pressure on top of the diaphragm in the valve 49, thereby shutting off the main gas supply.

If desired, an ordinary type of pilot light 75 connected by a line 76 to the gas supply, may be employed in conjunction with the thermostatic pilot.

Thus with the use of a single diaphragm valve we control the gas supply in accordance with the steam pressure in the boiler, the temperature of the water in the storage tank, and the temperature of the steam issuing from the boiler. We further provide that the diaphragm valve will operate to shut off the main gas supply in the event that the water level in the boiler falls below a safe point, and in the event that the pilot light goes out.

Figure 8:
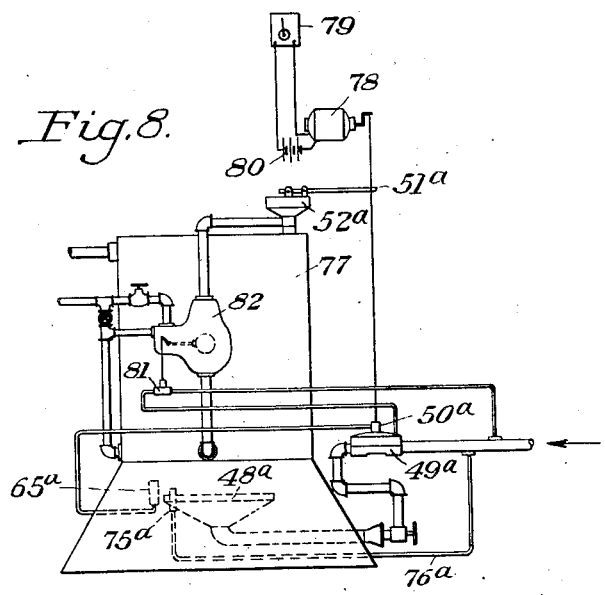

In Figure 8 we have illustrated our improved control apparatus applied to a steam boiler such as may be used for domestic heating purposes. In this embodiment, a steam boiler 77 is heated by a burner 48$^a$ supplied by gas to a diaphragm valve 49$^a$. The valve 49$^a$ is fitted with a control valve 50$^a$ by means of which gas is normally bled from the casing of the valve 49$^a$ above the diaphragm of the valve. The general operation of the valve 49$^a$ is the same as that of the valve 49 illustrated in Figure 7. The valve 50$^a$ is connected to a lever 51$^a$ which is moved in accordance with variations in the steam pressure within the boiler 77 by means of a steam responsive diaphragm device 52$^a$, the operation being to close the control valve 50$^a$ when the steam pressure within the boiler 77 exceeds a predetermined point.

We preferably obtain room temperature regulation by means of a thermostat motor 78 which is operatively connected to the lever 51$^a$. The motor 78 is controlled by a room thermostat 79 placed at any desired point within the dwelling. By means of a battery 80, or other suitable source of electric power, the thermostat 79 serves to operate the motor 78 so that the valve 50$^a$ will be closed when the room temperature exceeds a desired point. Thus, by means of one diaphragm valve we control the boiler so that if the steam pressure of the boiler rises to a maximum safe point where the room is sufficiently heated, the gas supply is shut off; and if the room reaches a desired temperature before the normal steam pressure is obtained, the main supply of gas is shut off. We preferably provide that the outlet of the valve 50$^a$ leads to a thermostatic pilot 65$^a$.

We further provide a mechanically operable valve 81 connected to a float ball in an automatic water feeder 82 so that if the water feeder fails to work and the water falls below a safe level the valve 81 is opened. A gas line 81' leads from the main gas supply line through the valve 81 to the top of the casing of the valve 49$^a$. Thus, if the water level falls below a safe point, gas is directed to the top of the diaphragm in the valve 49$^a$ and the valve 49$^a$ is closed, thereby shutting off the gas supply to the burner 48$^a$. The automatic water feeder 82 will not be described as it is well understood in the art to which the invention pertains.

The effect of the thermostatic pilot 65$^a$ is the same as that of the pilot 65 described in connection with Figure 7. The thermostatic pilot 65$^a$ may be supplemented with an ordinary pilot burner 75$^a$ connected to the gas supply through a suitable pipe 76$^a$.

Figure 9:
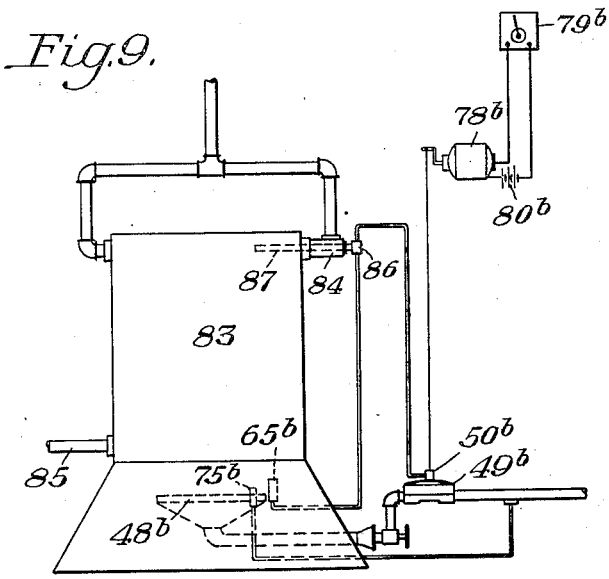

In Figure 9 we have illustrated a hot water boiler 83 having an outlet connection 84 and an inlet connection 85. The boiler 83 is provided with a burner 48$^b$ supplied by gas through a diaphragm valve 49$^b$ which is fitted with a control valve 50$^b$. The control valve 50$^b$ is operatively connected to a motor 78$^b$ which is controlled by a room thermostat 79$^b$ through a suitable source of electrical energy 80$^b$, the effect of the thermostat 79$^b$ and motor 78$^b$ being to close the control valve 50$^b$ when the temperature of the room in which the thermostat is located reaches a desired point, thereby closing the valve 49$^b$ and shutting off the main gas supply.

The outlet from the control valve 50$^b$ leads to a valve 86 which is controlled by a thermostat 87 located within the hot water outlet 84. The effect of the thermostat 87 is to close the valve 86 when the temperature of the water within the outlet 84 has reached a desired temperature. From what has been indicated above, it will be apparent that closing the valve 86 has the effect of shutting off the main gas supply to the burner 48$^b$.

Gas is led from the valve 86 to a thermostatic pilot 65$^b$ hereinbefore described. As indicated above, if the pilot light goes out, the thermostatic pilot 65$^b$ will operate to build up a back pressure on top of the diaphragm within the valve 49$^b$ and so shut off the main gas supply. An ordinary pilot burner 75$^b$ may be employed if desired.

Thus we provide an improved control system wherein the gas is shut off when the room has reached the desired temperature, or when the temperature of the water issuing from the boiler reaches a desired maximum point. If the boiler 83 is being started up, the valve 86 will operate to shut off the gas supply in case the temperature of the water within the boiler reaches a safe maximum before the room where the thermostat 79$^b$ is located has been brought to the desired temperature. Again, if the room reaches the desired temperature before the water in the boiler reaches the maximum temperature to which the thermostatically operated valve 86 is set, the thermostat 79$^b$ and motor 78$^b$ will operate to close the control valve 50$^b$ and so shut off the gas supply.

Figure 10:
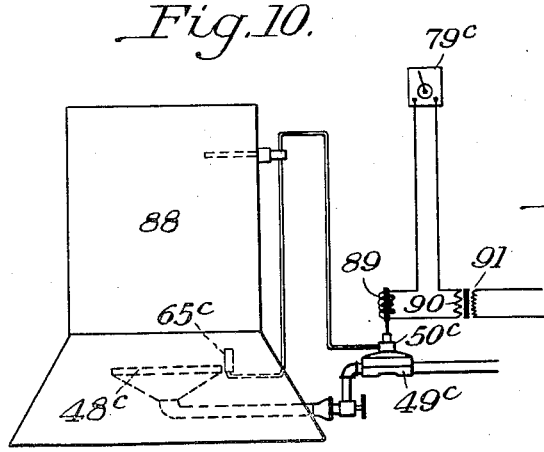

Figure 10 diagrammatically illustrates a modification of our invention wherein a boiler 88 is controlled in accordance with the temperature within the boiler and in accordance with the temperature at another joint in the system. An electric thermostat 79$^c$ operates to connect and disconnect a solenoid 89 across the secondary 90 of a transformer 91 connected to a suitable source of electrical energy. The disconnection takes place when the temperature at the point where the thermostat 79ᶜ is located has reached the desired point, and the effect is to permit closing of the control valve 50ᶜ which will result in a diaphragm valve 49ᶜ shutting off the gas supply to a burner 48ᶜ. The above operation presumes that the valve 50ᶜ is normally closed by a spring (Figure 6), but it will be understood that the precise mode of operation may be varied somewhat, for example, the control valve 50ᶜ may be arranged so that closing the circuit across the secondary of the transformer 91 will result in closing the valve 50ᶜ.

The outlet from the control valve 50ᶜ leads to a valve 86ᶜ controlled by a thermostat 87ᶜ within the boiler 88. The outlet from the valve 86ᶜ leads to a thermostatic pilot 65ᶜ. The operation of the parts has been set forth in connection with Figure 9, and the effect of closing the valve 86ᶜ or blowing out the flame of the pilot 65ᶜ will result in shutting off the main gas supply to the burner 48ᶜ.

In connection with Figure 8, we may say that in a steam boiler there is practically no danger from fire hazard unless there is no water in the boiler. It is possible that all of the water within the boiler might be evaporated and there would be no conditions operating on the controls used to shut off the gas supply. By our method, however, we would automatically close off the gas supply when a dangerous water level had been reached. Furthermore, by our improved system we secure a safe control which is not dependent upon the bleed hole functioning, for even if the bleed hole should clog up so that the diaphragm valve would ordinarily fail to seat, the valve 81 would admit gas to the top of the diaphragm within the diaphragm valve 49ª and force the valve shut. It will be understood that this method of controlling the gas supply from the most hazardous point in the system may be employed in combination with the various other controls illustrated without departing from the spirit of the invention.

Thus we provide an improved diaphragm valve wherein a tight seating of the valve disk is insured at all times by the provision of a valve disk which will accommodate itself to inaccuracies in the valve seat, although limited closing pressures may be available.

We further provide an improved bleed hole construction which obviates the possibility of the hole becoming clogged with solid matter deposited from the gas controlled.

Further advantages accrue to our invention by reason of a minimum flow adjustment operable to maintain the valve disk at least a predetermined distance away from the valve seat.

We further provide an improved method of operating diaphragm valves, the method comprising adjusting the back pressure on the diaphragm by means of a control valve operated in accordance with variations of one or more functions of the system in which the valve is employed.

We also provide an improved control for gas flow wherein a diaphragm valve is normally operated to vary the flow of gas in accordance with the demands of the system, and wherein an additional control responsive to the conditions at the most hazardous point of the system operates to close the main diaphragm valve in the event that a dangerous condition arises at the hazardous point.

Our invention affords an improved control system by reason of the advantages outlined above in combination with means whereby the main gas supply is shut off in case the pilot light should go out.

Still a further advantage arises from the provision of a valve of the diaphragm type operable in accordance with balanced or unbalanced pressure conditions, in which means other than a bleed opening is provided for quickly building up pressure above the diaphragm, whereby the closing action of the valve is not only speeded up, but is made more positive.

While we have illustrated and described certain preferred embodiments of our invention and methods of operating the same, it will be understood that the invention is not limited to the embodiments illustrated, but that the invention may be otherwise practiced and embodied within the scope of the following claims.

We claim:

1. The combination with a diaphragm valve in a heating system having a fluid heating chamber, said valve having a diaphragm, of means controlling the diaphragm in accordance with variations in the contents of the heating chamber, and means controlling the diaphragm in accordance with a temperature of the system.

2. The combination with a diaphragm valve in a heating system, said valve having a fluid pressure controlled diaphragm, of bleed means adapted to permit a back pressure to build up against the diaphragm, relief means responsive to a temperature of the system and a function of the system other than temperature for relieving said back pressure, and back pressure increasing means adapted to admit pressure fluid to the diaphragm whereby the valve is closed in response to a predetermined condition in the system.

3. The combination with a diaphragm valve, of a main burner supplied with gas controlled by the valve, a pilot burner for said main burner, a system heated by the main burner, means controlling the valve in accordance with variations of a predetermined condition of the system at a point remote from the main burner, means controlling the valve in accordance with variations of a predetermined condition of the system at a point adjacent the burner, and means adapted to close the valve when there is no flame at the pilot burner.

4. The combination with a diaphragm valve for use in a heating system having a fluid heating chamber, said valve having a gas pressure controlled diaphragm, of means adapted to permit a back pressure to build up against the diaphragm, means normally relieving said back pressure to maintain the diaphragm valve open, control means responsive to the pressure in the heating chamber and to a temperature of the system at a point remote from the fluid heating chamber and adapted to shut off the relief means when the pressure in the heating chamber or the temperature at said point reaches a predetermined value, a pilot burner connected to the pressure relieving means, and means adapted to close the pilot burner outlet when there is no flame at the pilot burner.

5. The combination with a diaphragm valve for use in a heating system having a fluid heating chamber, said valve having a gas pressure controlled diaphragm, of means adapted to permit a back pressure to build up against the diaphragm, means normally relieving said back pressure to maintain the diaphragm valve open, control means responsive to the pressure in the heating chamber and to a temperature of the system of a point remote from the fluid heating chamber and adapted to shut off the relief means when the pressure in the heating chamber or the temperature at said point reaches a predetermined value, a pilot burner connected to the pressure relieving means, means adapted to close the outlet when there is no flame at the pilot burner, and back pressure increasing means responsive to liquid level in the fluid heating chamber and adapted to admit pressure fluid to the diaphragm, whereby the valve is closed when the liquid level falls to a predetermined point.

6. The combination with a diaphragm valve in a heating system having a fluid heating chamber, said valve having a diaphragm, of means controlling the diaphragm in accordance with variations in the pressure of the heating chamber, and means controlling the diaphragm in accordance with a temperature of the system.

7. The combination with a diaphragm valve in a heating system having a fluid heating chamber, said valve having a diaphragm, of means controlling the diaphragm in accordance with variations in the pressure of the heating chamber, and means controlling the diaphragm in accordance with the contents of the heating chamber.

8. The combination with a diaphragm valve in a heating system having a fluid heating chamber, said valve having a diaphragm, of means controlling the diaphragm in accordance with variations in pressure of the heating chamber, means controlling the diaphragm in accordance with the contents of the heating chamber, and means controlling the diaphragm in accordance with a temperature of the system.

In testimony whereof we have hereunto set our hands.

FREDERICK W. ROBERTSHAW.
GEORGE A. ROBERTSHAW.